United States Patent [19]
Phillips et al.

[11] Patent Number: 6,019,810
[45] Date of Patent: Feb. 1, 2000

[54] EFFLUENT TREATMENT SYSTEM FOR REMOVING EFFLUENT GASES FROM A GAS STREAM

[75] Inventors: John Paul Phillips; Kieran John Mullins, both of Dublin, Ireland

[73] Assignee: Bord na Mona, Dublin, Ireland

[21] Appl. No.: 08/967,720

[22] Filed: Nov. 10, 1997

Related U.S. Application Data

[63] Continuation-in-part of application No. PCT/IE96/00026, May 10, 1996.

[30] Foreign Application Priority Data

May 10, 1995 [IE] Ireland ..................................... 950337
Sep. 25, 1995 [IE] Ireland ..................................... 950745
Apr. 30, 1996 [IE] Ireland ..................................... S960322

[51] Int. Cl.[7] .............................................. B01D 39/02
[52] U.S. Cl. ................................ 55/512; 55/524; 55/522; 55/529; 96/290; 261/DIG. 72
[58] Field of Search ............................ 261/DIG. 72, 94; 96/290, 153; 210/150, 617; 55/512, 524, 529, 522

[56] References Cited

U.S. PATENT DOCUMENTS

| | | | |
|---|---|---|---|
| 1,077,243 | 10/1913 | De Cew | 261/DIG. 72 |
| 3,364,656 | 1/1968 | Whiton et al. | 261/94 |
| 3,543,937 | 12/1970 | Choun | 210/150 |
| 4,977,090 | 12/1990 | Butterman et al. | 435/266 |
| 5,387,344 | 2/1995 | McCombs et al. | 210/617 |
| 5,525,228 | 6/1996 | Daque et al. | 210/617 |
| 5,569,634 | 10/1996 | Miller et al. | 210/617 |
| 5,578,214 | 11/1996 | Yamasaki et al. | 210/617 |

FOREIGN PATENT DOCUMENTS

| | | |
|---|---|---|
| 0100024 | 2/1984 | European Pat. Off. . |
| 0336119 | 10/1989 | European Pat. Off. . |
| 2655563 | 6/1991 | France . |
| 3928255 | 2/1991 | Germany ........................... 210/617 |
| 4032234 | 4/1992 | Germany . |
| 4235591 | 11/1993 | Germany . |
| 9302254 | 12/1993 | Netherlands . |
| 1204781 | 9/1970 | United Kingdom . |
| 1328397 | 8/1973 | United Kingdom . |
| WO93/25205 | 12/1993 | WIPO . |

Primary Examiner—David A. Simmons
Assistant Examiner—Robert A. Hopkins
Attorney, Agent, or Firm—Jacobson, Price, Holman & Stern, PLLC

[57] ABSTRACT

An effluent treatment system for removing effluent gases from a gas stream including a packing having a plurality of randomly arranged elements of calcareous material. The elements may be spent shells of shellfish, especially half mussel shells and have a liquid retention portion which may form an individual liquid reservoir depending on the orientation of the element with the packing. Suitable bacteria are retained in at least some of the reservoirs. The system may be operated as a biofilter or a bioscrubber.

40 Claims, 6 Drawing Sheets

EFFLUENT TREATMENT SYSTEM FOR REMOVING EFFLUENT GASES FROM A GAS STREAM

This application is a continuation of international application PCT/IE96/00026, filed May 10, 1996.

INTRODUCTION

The present invention relates to effluent treatment and in particular to an effluent treatment system for removal of effluent gases from a gas stream.

Typically, the effluent gases are malodorous gases such as hydrogen sulphide ($H_2S$), organosulphur or organonitrogen compounds or other V.O.C's. The present abatement systems, as they are often called, may also be particularly applicable to chlorinated hydrocarbons.

It has long been appreciated in any biofiltration system that one of the primary requirements is an efficient nutrient system for cultivation of bacteria. Most of the work heretofore has concentrated on the materials of the biofiltration per se which have included complex mixtures of organic and inorganic material. Calcarous materials have also long been appreciated as being of considerable importance in biofiltration. Under microbial activity $H_2S$ converts to $H_2SO_4$ which then reacts with $CaCO_3$ to produce $CaSO_4+H_2O+CO_2$. This ensures that the acid produced is neutralised.

It has been known to use calcarous material of marine origin as the media or packing material in the construction of biofilter plants. Generally, such calcarous material when used in the bed of the biofilter has been a rigid material which is usually ground to uniform particle size, which particle size varies from, for example, of the order of 30 microns to more than 25 mm, depending on the effluent gas being treated. An example of such an approach is disclosed in International Patent Application No. WO 93 24205 (Berney). This relatively homogeneous packing material was apparently chosen to prevent deterioration of the bed, sometimes known as "bed cracking" which is essentially the production of short circuiting channels in the packing material. Considerable work has been carried out in reducing the irregularities in the packing material by, as mentioned above, either ensuring that the calcarous material is ground to a relatively uniform size or by the inclusion of light uniform biodegradable materials as an admixture with the calcarous material such as in the previously referred to Berney specification.

There are however disadvantages in using such packing materials. In particular, in dealing with effluent treatment the level of odour production can vary in many instances. This is particularly the case with sewage at the inlet works. For example, the length of the incoming sewer will directly impact on the level of septicity in the sewage. The level of industrial waste entering a sewage works will, likewise, impact on the production of odorous compounds. In addition, there are extensive daily variations with a sewage treatment facility. There are further situations that impact on the level of odorous gases such as hydrogen sulphide ($H_2S$). Indeed, under anoxic and anaerobic conditions sludges accumulate, in particular, sulphur containing compounds which are highly odorous at very low concentrations. The problem is that the emission of odours peaks when the sludge is disturbed and this can happen either when sludge storage tanks have been emptied or additional sludge is added to such storage tanks. This is particularly relevant to works where sludges are gathered into a central facility for treatment as the incoming sludge can be highly septic and when pumped into the sludge storage tanks, can cause levels of $H_2S$ to increase by as much as ten-fold. This is obviously a very difficult handling problem.

In U.S. Pat. No. 4,977,090 there is an indication that, for example, crawfish shells and crab shells could be used in a process for decontamination of oxygenated gases. However, there is no teaching of the use of these bodies for this purpose, nor indeed of the advantage of the use of shells to firstly hold water and bacteria and secondly to provide calcarous material. This particular invention relates solely to the growing of pocket rot mushrooms in a waste material, which waste material doesn't totally solidify with pressure and provides a number of voids. Generally the specification teaches the use of these body forms through which mushroom mycelia is grown. The whole purpose is to produce connected body forms. Whether one would suggest that almost certainly if shells had been used they would have improved the activity of the effluent treatment is not apparent from the specification. Hutterman effectively teaches a packing through which mushrooms can grow. The present Applicants, as will be seen below, teach a packing which has a plurality of liquid retention elements. Hutterman almost suggests in a throw-away manner that shells could be one of the waste products that could be used. Indeed Hutterman suggests in his specification that it will be apparent that the outer configuration can be of almost any kind and is not subject to any limitations so long as dump mounds of the body forms have sufficient permeability. Indeed all the teaching is to do with production of the substrate through which mushroom permeated body forms can grow. This patent specification suggests it is necessary to cut up the various wood, straw and other particles to form the substrate: there is no teaching of the using of them in the manner of the present invention. One has to assume that if one were to read this specification that one would presume that the first thing one would have to do with the other materials mentioned such as crawfish shells and crab shells would be to chop them up.

Also of significance could be Netherlands Patent Specification No. 9302254 which was not published until after the priority date of this present application, thus does not form a prior publication. However, in spite of it not forming a prior publication, it is important to consider the specification. It is suggested that on an accurate and careful reading of this specification it discloses quite clearly that it does not teach what is in effect the present invention, namely the manner in which the packing material can be produced to provide the necessary activity. Indeed it is significant that in the International Preliminary Examination Report as issued under the original PCT Application No. PCT/IE96/00026 that the Examiner did not refer to this specification, but indeed referred exclusively to U.S. Pat. No. 4,977,090.

It is not just simply the variation in concentration of $H_2S$ but the variation in concentration of other compounds that cause difficulty. This in turn causes major difficulties in the design of abatement systems: if the average inlet concentration is used in the design, then the abatement system, must be capable of coping with peak values. If the system is designed for the peak loadings, then it may not produce an optimum result due to nutrient starvation in the case of biological systems. In addition, design for peak level increases the size and hence the cost of the whole abatement system.

Biological waste treatment systems have been increasing in popularity, but unfortunately, they are limited in their ability to handle these variable loads. Both biofiltration and bioscrubbing abatement systems have been increasingly successful with low running costs, high performance, high reliability, low maintenance, absence of secondary waste and finally versatility in the range of pollutants that can be treated. One of the major problems with many well known biofiltration systems is that while they are highly successful in removing $H_2S$, the biological conversion of $H_2S$ generates $H_2SO_4$ which causes the pH of the system to decrease and if uncontrolled, it can fall to below 4.0 in turn causing inhibition of most biological activity, often referred to as "souring".

Many of these biofilters have peat as their medium and the souring has been controlled by either the addition of calcarous material to the peat often in the form of lime, or the use of a water-sprinkling system to wash off the excess $H_2SO_4$. While these approaches are reasonably successful, prolonged exposure to levels of $H_2S$ greater than the design level still results in souring which often necessitates pH adjustment.

A further problem with biofiltration systems is that while they are often highly efficient at steady state loadings, the efficiency reduces as the loadings increase. A typical design limitation appears to be of the order of 20 ppm $H_2S$ removed at a loading of 100 $m^3/m^3$ of media/hour. If there are higher concentrations at source, then dilution is necessary or a reduction in gas flow is required. In some situations the difficulty is overcome by combining off-gases from different locations so as to keep the inlet concentration to the biofiltration system at an acceptable level. Needless to say, the necessity of dilution or reduction in flow rates will result in an increase in the size of biofilter with a corresponding increase in cost and in any event lead to more complex equipment to ensure that the difficulties of peak loadings are overcome.

Another major problem in the use of any biological system is that it is dependent on the activity of the microorganisms present in the system. It is accordingly essential that the efficient seeding of a biological system with bacteria is carried out to ensure that the inoculum is not washed from the filter media before it becomes effectively established. In addition, it is necessary to ensure that the culture survives during periods of starvation as inlet concentrations dip. It is vital that the inoculation bacteria will remain viable even in periods of starvation and are thus usable when it subsequently peaks.

It has long been known that one of the major problems in the treatment of malodorous gases is the necessity to control energy consumption and thus the pressure drop across the packing medium is all important. Thus, as the height of the beds increase, the difficulties in relation to energy consumption increase. At the same time there is a need for the efficient distribution of the effluent gases throughout the bed or indeed the efficient distribution in other filtration plants of liquids throughout a packing material or biologically active material. This has been understood by many of the people working in the field such as for example the invention described in European Patent Specification No. 0 080 747 B1, where some attention was paid to the composition of the actual filtration material, namely its physical composition. However, this specification does not disclose any solution to the problem beyond suggesting that a packing material of varying sizes may be advantageous in that it will reduce the pressure drop across the packing material. It however is based on the use of substantially inactive material of particle size in excess of 6 to 10 mm combined with fractions of active material having particle sizes less than this. Further this patent specification refers to and acknowledges the problems in relation to moisture retention without proposing any solution to the problems. Indeed, the only work of a detailed and analytical nature carried out on the actual physical construction and nature of the packing material has been by ourselves. However, heretofore, nobody has analysed in any detail, or, indeed considered the physical construction of the biologically active medium in detail. Work has concentrated on the source of suitable material, rather than the actual physical construction of the material and also in turn the physical construction and nature of the bed itself utilising such material.

There is a need for a system that will handle high and variable levels of malodorous gases and in particular high and variable levels of $H_2S$. It is an object to provide odour abatement systems which will successfully treat the odorous gases while minimising initial capital cost and subsequent running costs.

STATEMENTS OF INVENTION

According to the invention, there is provided an effluent treatment system for removing effluent gases from a gas stream comprising a packing through which the gas stream is led, the packing comprising a plurality of randomly arranged elements of calcarous material having a liquid retention portion which may form an individual liquid reservoir depending on the orientation of the element within the packing.

Moisture retention is a major problem in any biofiltration system and this has been long appreciated by the use of material in the formation of the media which is inherently adapted to retain moisture. Unfortunately, there are consequent problems in using such materials. Thus, it is known to use some of these with calcarous materials. With a calcarous material, it is essential that sufficient moisture be retained within the media to ensure the growth of bacteria thereon. This can only be done if the media is sufficiently moisture retentive and heretofore required that it should be mixed with, for example, peat, or indeed be continuously sprayed. The use of liquid reservoirs overcomes this problem.

It is almost impossible to overemphasise the importance of the liquid retention portion of the calcarous elements on the efficient operation of the effluent treatment system according to the invention. The individual liquid reservoirs thus defined add a new dimension to the use of calcarous material as the packing.

Ideally, bacteria are retained in at least some of the reservoirs. As mentioned above, the shape of the calcarous material is very important and if, in addition, the medium has a shape which will allow it to retain bacteria, then it is particularly advantageous since there is always a balance required between retention of bacteria and providing a suitable easy passage for the effluent gases. It will also be appreciated that if the bacteria is retained in relatively clearly defined pockets or reservoirs, the calcarous material can then be exposed to the effluent stream without a coating of bacteria as can the bacteria be exposed to the effluent stream of gases. The orientation of the elements ensures this.

In many instances, bacteria are additionally retained on some of the surfaces of the elements. Some of the bacteria will naturally be retained on some but not all of the surfaces. This will largely depend on the amount of bacteria within the system and also the actual orientation of the particular element. It is a very efficient way of storing bacteria while simultaneously exposing it to an effluent gas stream.

Ideally, the packing has a bulk density of less than 900 g/liter, in some instances less than 600 g/liter, and indeed in one embodiment has a bulk density of approximately 500 g/liter. The lighter the packing material can be, the less problems there are with structural integrity of any column of the packing material, also, the greater depth of packing material that can be achieved before the structural integrity of the elements becomes important.

In one particularly advantageous embodiment of the invention, the packing is spent shell of shell fish. There are enormous and unforeseen advantages in using the spent shell of shell fish. Firstly, it is a byproduct of various food operations in that oysters, whelks, mussels, clams and so on are processed in factories which produce a large amount of spent shells which then have to be disposed of, causing pollution. In any event, the disposal of such shells is expensive. Anything that removes the necessity to spend money on the disposal of the shells but additionally makes them a valuable commodity is obviously extremely advantageous. It has long been appreciated that spent shells of shell fish are a major source of calcium material. It would be wrong to underrate the disposal problem experienced by many shell fish processors. A further advantage of the use of spent shells is that they are of a particularly useful shape in that some of the shells will be broken, others will have their full structural integrity and so on, so that the bed formed by the use of the spent shells will be a bed that will ensure adequate flow of gases and adequate retention and moisture by providing a sufficient number of shells which will form individual liquid reservoirs. It has been found that mussel shell or, more correctly, a half mussel shell is particularly advantageous as there is a large amount of mussel shell available after processing in factories. It is particularly appropriate to use such a shell as it is not alone efficient in use, but equally needs to be disposed of on a regular basis. Thus, the raw material for the initial preparation of the system packing, together with its replacement when the shell used has passed its useful life, is readily available and inexpensive. Further, mussel shell is particularly structurally rigid.

Ideally, the shell material is a half mussel shell and preferably is of the species *Mytilus Edulis*. *Mytilus Edulis* which is readily available has, in practice, turned out to be particularly useful as a form of shell for use in the present invention.

In an effluent treatment system in accordance with the invention, the packing may include one or more additional packing materials. In many instances, it will be advantageous to provide different packing materials because they can add to the efficiency of the effluent treatment particularly where specific effluent gases are likely to be treated on a regular basis. However, the calcarous material according to the present invention and in particular, elements of calcarous material each having a liquid retention portion are particularly advantageous for mixing with other media in the sense that these liquid retention portions will also provide a means for retaining the other media in position in the bed and ensuring that such other media is not washed away or otherwise removed from the bed.

Some or all of the elements may be formed from ground calcarous material mixed with a binding agent. If ground calcarous material is used to make what is effectively a totally artificial element to form the packing, there are considerable advantages. Firstly, the binding agent can be chosen to provide the correct degradation of the calcarous material. Suitable trace elements and additives may also be combined with the calcarous material to further enhance the efficiency of the system. Additionally, because a binding agent is used and the media is manufactured, the correct size and shape of the media can be chosen to provide the most efficient filtration system. Thus, the packing chosen can be totally uniform in shape or can be provided by a number of different shapes to ensure there is an adequate flow of gas through the media. Also, the use of different shapes can allow the mixing of other materials therewith and the medium can be so shaped as to ensure that such other additional packing materials can be retained within the medium. Structural requirements to ensure such additional packing materials are adequately supported can be achieved by manufacturing the elements in the desired and optimum shape. Shapes can be devised and designed to ensure, for example, in conditions where evaporation could be a problem, that the liquid retention portion is so designed as to have a large capacity and a relatively small surface area exposed to ambient conditions.

Preferably, the binding agent is acid resistant. It will be appreciated that the binding materials must be such as to ensure that in generation of acid within the system, the elements do not degrade and cause the packing to lose its structural integrity.

Ideally, the binding agent is Keratin. This is a particularly suitable binding agent for combination with the calcarous material used in accordance with the invention.

Many additional packing materials such as one or more of: heather, peat nodules, activated carbon, alumina and plastics media may be used. Heather, peat nodules, activated carbon, alumina and plastics media have all been shown to have their advantages. While in many instances, certain of these may not be totally biodegradable, they have other advantages in, for example, with a plastics material, adding to the structural rigidity of the structure and providing, if suitably shaped, further individual liquid reservoirs.

Ideally, the bacteria are selected to assist the breakdown of sulphur and sulphur analogues. The bacteria are preferably of the Thiobacillus and/or Rhodobacter species, and the bacteria may be selected from one or more of: *thiosphaera pantotropha, thiobacillus thioparus, thiobacillus thiooxidans, thiobacillus ferroxidans,* nirosomonas, nitrobacter, pseudomonas, rhodococcus, fungi, and streptomyces. While such bacteria are in many instances well know for the treatment of effluents, they have been found to be particularly effective with the packing according to the present invention.

Ideally, nutrients and/or trace elements are added to maintain an active biomass. One of the great advantages of the elements of calcarous material each having a liquid retention portion which may form an individual liquid reservoir is that these portions can also hold nutrients and other trace elements as well as the bacteria and thus they assist in ensuring that the nutrients and trace elements are available to maintain the active biomass.

Ideally, wetting means are used in conjunction with the system and such wetting means usually comprises a spray operating under gravity. It is obviously very useful to ensure that the packing is sufficiently moist. The wetting means may be operated intermittently. This is assisted by the fact that the packing according to the present invention is formed from a number of randomly arranged elements each having a liquid retention portion which may form an individual liquid reservoir depending on the orientation of the element within the packing and thus it is not necessary to continuously wet the packing and this leads to both operational and other savings. In many instances in accordance with the invention, the wetting means is operated continuously and may indeed be achieved by recirculating water over the packing. It is obviously generally advantageous to wet the packing continuously if water can be recycled and recirculated. In many instances, the water used will be the final run water of the treatment plant itself.

In a particularly useful embodiment of the invention, the wetting is carried out in concurrent flow to the flow of the gas stream through the packing. The advantage of this is that with concurrent flow, the maximum reaction with the calcarous material takes place at the top of the packing bed and hence the maximum amount of chemical reaction with the elements of calcarous material occurs at the top of the packing and thus, as it deteriorates, it contributes less, by its deterioration, to the general reduction in structural rigidity of the packing than it would if the water and gas were in counterflow.

In one example of an effluent treatment system according to the invention, the packing is wetted with wetting liquid at a rate of from 0 liters per hour to 1,000 liters per hour. If it were not for the generally cellular and open nature of the packing according to the present invention, it would not be possible to use such high flow rates. The advantage in using such high flow rates is that in situations where there is an excessive concentration of gas at peak loadings, the water throughput can be increased to further increase the efficiency of the plant. The wetting liquid may have a temperature of from 4° C. to 40° C. and a pH of from 1.0 to 10.0. Ideally, the pH should be adjusted and in a system according to the invention, it is adjusted by adding a base such as sodium hydroxide and/or an acid such as sulphuric acid to the wetting liquid. For example, in the case of $H_2S$ the pH is preferably adjusted to approximately 7 in order to solubilise the $H_{2S}$. The temperature must be kept within the range of 4° C. to 40° C. to ensure that the bacteria operate effectively.

In an effluent treatment system according to the invention, the inoculation of the system is carried out by:

spraying a calcarous packing with a solution containing calcium; and inoculating the packing with bacteria.

Ideally, the bacteria are mixed with an immobilizing agent such as sodium alginate. Preferably, the calcium solution is a solution of calcium chloride. The spraying of $CaCl_2$ is particularly advantageous in that on contact with the bacteria and its immobilising agent, it will form, for example when in contact with sodium alginate, a suitable gel which will allow the bacteria to be retained within the reservoirs and possibly in contact with the surfaces of the elements over a relatively long period of time without deterioration.

Preferably, the inoculated packing is wetted either continuously or intermittently. This ensures that the packing does not dry out.

DETAILED DESCRIPTION OF THE INVENTION

The invention will be more clearly understood from the following description thereof, given by way of example only with reference to the accompanying drawings in which:

FIG. 1. illustrates a typical variation in the concentration of $H_2S$ in a sewage works;

Figure 1:
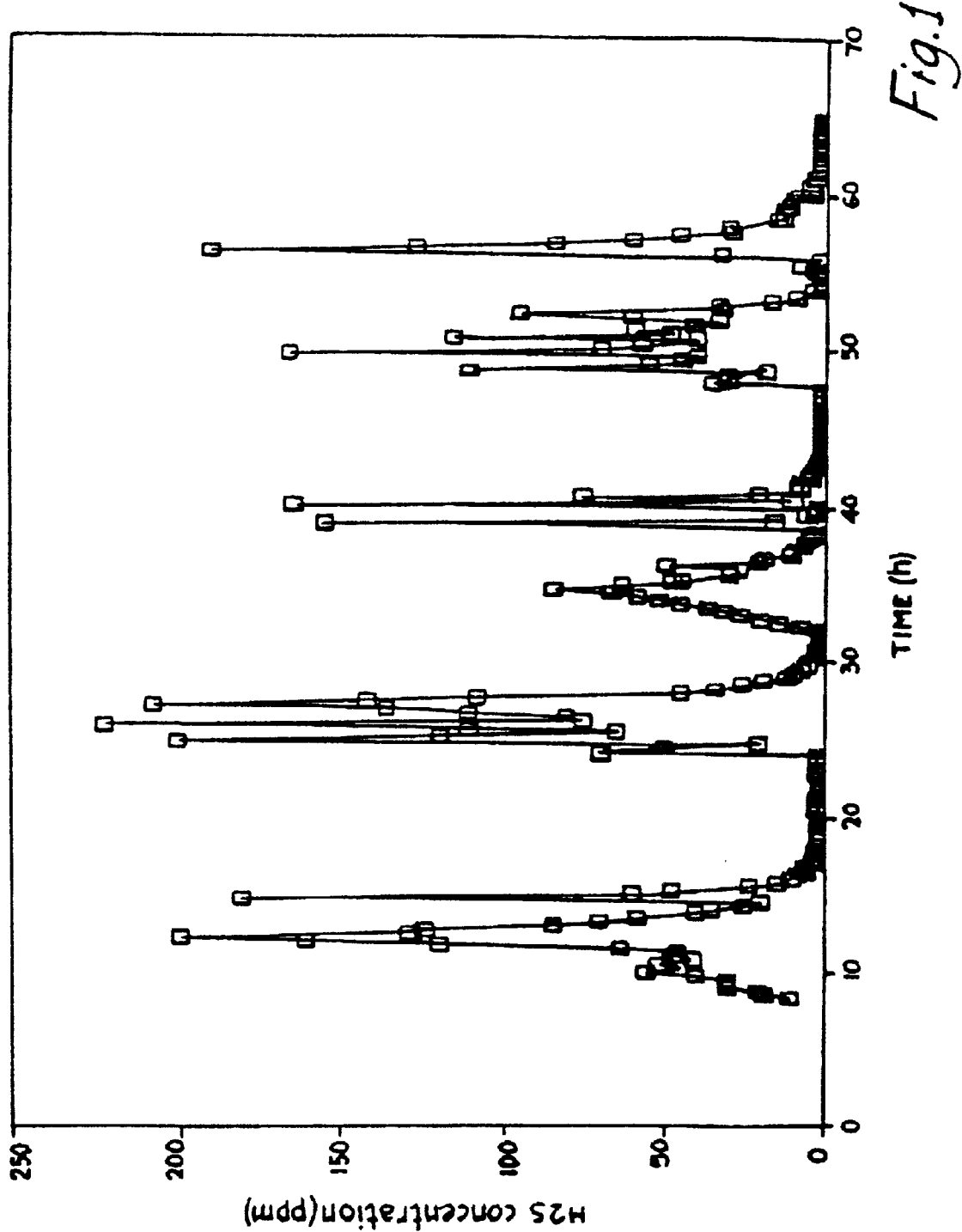

Referring to the drawings and initially to FIG. 1 there is illustrated $H_2S$ concentrations at a picket fence thickener and macerating chamber of a sewage works. It will noted the extreme variation in $H_2S$ in such a works. As mentioned above it is the sudden variation in concentration that gives rise to major difficulties in the design of the treatment plant.

Tables 1 and 2 illustrate typical concentrations of odour and sulphur compounds in gas emissions from a municipal waste water treatment plant.

TABLE 1

Concentrations of odour and sulphur compounds in municipal wastewater treatment plants

| | Typical Concentration Range | | | |
|---|---|---|---|---|
| Installation | Odour (ou/m³) | Hydrogen sulphide (ppm) | Methyl Mercaptan (ppm) | Alkyl Sulphides (ppm) |
| Sewage Pumping Station | 100–1000 | <1 | <1 | <1 |
| Inlet works (gravity feed) | 50–5000 | <1 | <1 | <1 |
| Inlet words (rising mains) | 1000–10000 | 1–10 | 0–5 | 0.5–5 |
| Screening plant | 100–5000 | 1–10 | 0.5–5 | 0.5–5 |
| Grit Trap | 500–5000 | 1–5 | 0.5–1 | 0.5–1 |
| Primary Settlement Tank | 50–1000 | ≦1 | <1 | <1 |
| Flow dividing chamber | 50–1000 | 1–5 | ≦1 | ≦1 |
| Tricking filter | 50–5000 | ≦1 | ≦1 | <1 |
| Aeration basin | 50–5000 | 1–5 | <1 | <1 |

TABLE 2

Concentrations of odour and sulphur compounds in municipal wastewater treatment plants

| | Typical Concentration Range | | | |
|---|---|---|---|---|
| Installation | Odour (ou/m³) | Hydrogen sulphide (ppm) | Methyl Mercaptan (ppm) | Alkyl Sulphides (ppm) |
| Final settlement tank | <500 | <1 | <1 | <1 |
| Balancing storm tank | <500 | <1 | <1 | <1 |
| De-sludging chamber | 1000–10000 | 10–100 | 1–10 | 1–10 |
| Sludge pumping station | 5000–20000 | 10–200 | 1–20 | 1–10 |
| Primary sludge tank | 1000–50000 | 10–500 | 1–250 | 1–50 |
| Sludge pressing plant | 1000–50000 | 0.5–50 | 0.5–15 | 0.5–5 |
| Filtrate sump | 5000–20000 | 10–200 | 5–50 | 1–20 |
| Activated sludge tank | 500–5000 | 1–5 | <1 | <1 |
| Picket fence thickener | 500–10000 | 5–100 | 1–10 | 1–5 |

Figure 2:
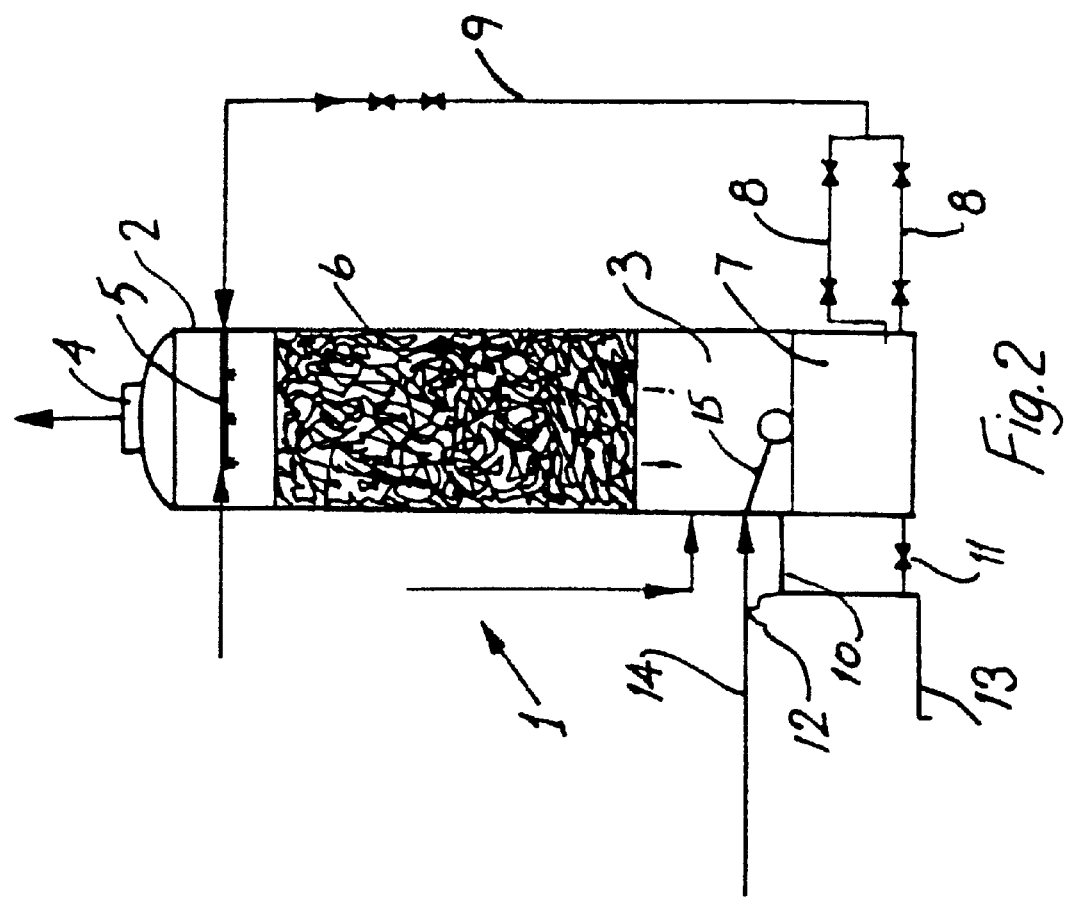
FIG. 2 is a schematic elevational view of an apparatus according to the invention in operation as a bioscrubber.
Figure 4:
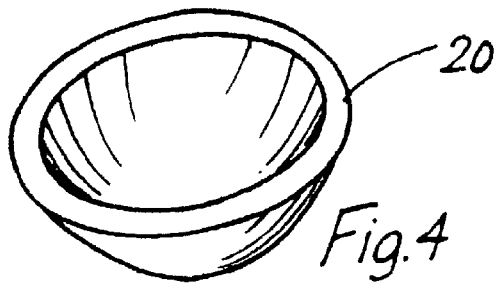
FIGS. 4 to 6 illustrate constructions of artificially formed packing materials.
Figure 5:
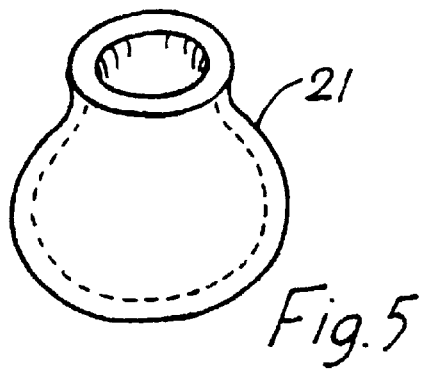
Figure 6:
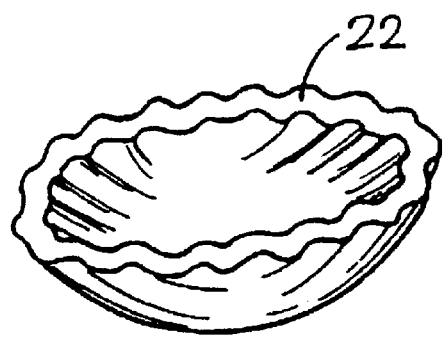
Figure 7:
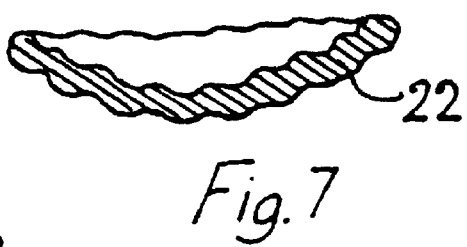
FIG. 7 is a cross-sectional view of the packing material illustrated in FIG. 6.
Figure 8:
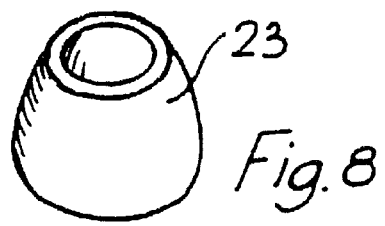
FIG. 8 is a view of a further construction of artificially formed packing material.
Figure 9:
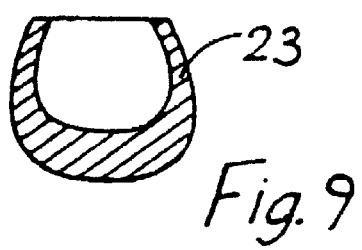
FIG. 9 is a cross-sectional view of the packing material of FIG. 8.

Referring to FIG. 2 there is illustrated an effluent treatment system apparatus for removing effluent gases from a gas stream indicated generally by the reference numeral 1. The apparatus 1 comprises a gas scrubbing device provided by a generally cylindrical housing 2, having a lower inlet 3 for a gas stream to be treated and an upper outlet 4 for exhaust of treated gas. A sprinkler bar 5 is mounted above a packing 6 forming a filter bed through which the gas stream is led from the inlet 3 to the outlet 4. The bottom of the cylindrical housing 2 forms a water reservoir 7 connected through recirculation pumps 8 and associated valves to the sprinkler bar 5, through a feed pipe 9. The water reservoir 7 is connected to a conventional overflow pipe 10. A drain-off cock 11 and vent 12 are provided as is a tank drain-off pipe 13 and a water make-up pipe 14 feeding through a ball-cock 15. Various portions of the apparatus are not illustrated as they are conventional and unnecessary for an understanding of the invention.

Preferably, the packing 6 described in considerable detail below contains bacteria selected to assist in breakdown of the effluent gases. For example, in the case where the effluent gas is hydrogen sulphide, $H_2S$, the bacteria is selected to assist the breakdown of sulphur and sulphur analogues. The bacteria may, for example, be of the Thiobacillus and/or Rhodobacter species and may be selected from one or more of *thiosphaera pantotropha, thiobacillus thioparus, thiobacillus thiooxidans,* and *thiobacillus ferroxidans.* Other suitable bacteria are given in Table 9 below.

Typically, the effluent gas stream to be treated is an air stream with a concentration of hydrogen sulphide in the range of 0 to 1000 ppm at loadings in the range of from 0 to 500 $m^3$ per hour per $m^3$ of packing. The temperature of the air carrying the $H_2S$ gas may vary from 4° C. to 40° C. The wetting liquid is generally water which flows over the packing of an abatement system at a rate of up to 500 liters per hour per cubic meter of packing material when acting as a biofilter. When acting as a bioscrubber the rate can be as high as 1000 liters/hr/cu meter of bed. In certain cases some bleed off of water may be required. The water temperature may vary from 4° to 40° C. and the pH of the water in the system may vary typically from 1.0 to 10.0. If necessary, the pH may be adjusted using any caustic or acidic solution as required.

Figure 3:
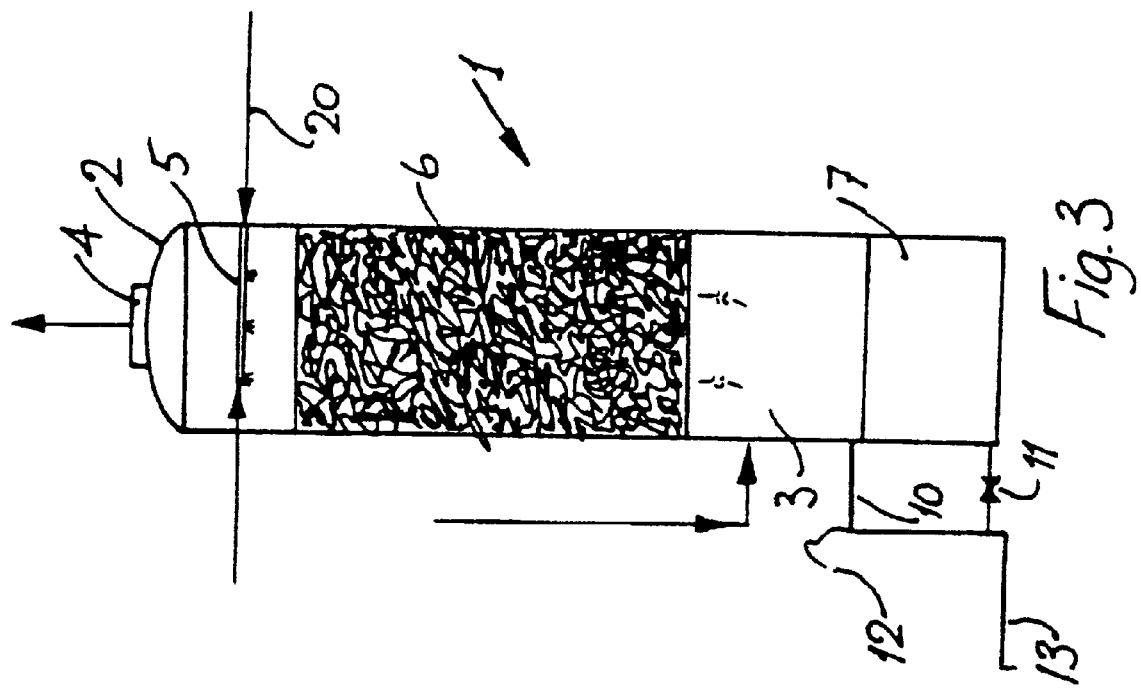
FIG. 3 is a view similar to FIG. 2 of the apparatus operated as a biofilter.

Referring to FIG. 3 there is illustrated the same apparatus as FIG. 2 now operating as a biofilter in that there are no pumps 8 or feed pipes 9. The sprinkler bar is fed directly from a water mains supply line 20 or as is the preferred method where possible from the final effluent.

The packing 6 comprises or at least contains shell-like material having a bulk density of less than 900 g/liter, preferably long than 600 g/liter and typically approximately 500 g/liter. The shell-like material is in this case the spent shell of shell fish, particularly calcarous shell, especially mussel shells of the species *Mytilus Edulis*. The packing may include one or more additional packing materials. Additional packing materials may include one or more of heather, peat nodules, activated carbon, alumina, or plastic media and the like.

In use, the elements will be shovelled or thrown or otherwise roughly charged into the housing so that they will be randomly and not regularly arranged.

Further, this random arrangement will ensure that some elements will fall one way and others another. For example, when the elements are of shell-like shape, whether of artificial construction or natural, they will nest into each other, bridge each other, lie upright upside-down with the mouth facing downwards and not forming a liquid reservoir etc. Such a scattering of the elements will ensure a packing that will be of a sufficiently open structure as to facilitate the passage of a gas stream therethrough.

The term shell-like, while particularly apt when considering shells of marine origin, does describe in general, it not very precise terms, the open-mouthed container-like construction of the individual elements constituting the packing, whether man made or naturally occurring.

Referring now to FIGS. 4 to 9 there is illustrated various artificially formed shell-like elements, hereinafter referred to as packing elements and identified by the reference numerals 20, 21, 22 and 23, respectively. Each of these packing elements 20 to 23 inclusive can be formed of any suitable calcarous material and a binder and may be formed by any suitable moulding or other formation techniques. The packing element 20 is the simplest construction, being essentially a dish or shell-like structure, while the packing element 21 has a much narrower mouth or opening as it where than the packing element 20. The packing element 22 is similarly differently shaped having a thicker lower portion to provide more active calcarous material for reaction during use. The packing element 23 shows the provision of an irregular outer surface which will further promote the adherence of moisture and biologically active material thereto as well as providing a greater available surface.

It is envisaged that many suitable binders could be used. For example, it would be possible to provide a binder that would ensure there was sufficient free calcium for example available to allow the packing to be inoculated with bacteria mixed with sodium alginate as discussed herein. A particularly suitable binder is Keratin. However, other suitable binders may be used.

Figure 10:
FIGS. 10 and 11 are top and underneath views of a half-mussel shell used in accordance with the invention.
Figure 11:
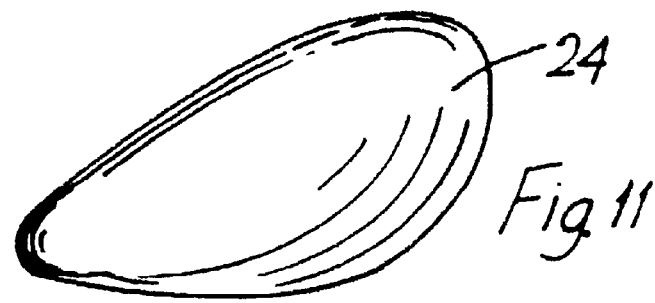
Figure 12:
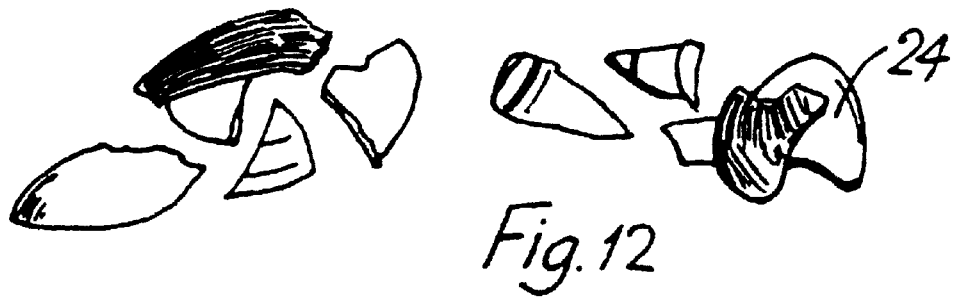
FIG. 12 is a view of some broken fragments of the mussel shells illustrated in FIGS. 11 and 12.
Figure 14:
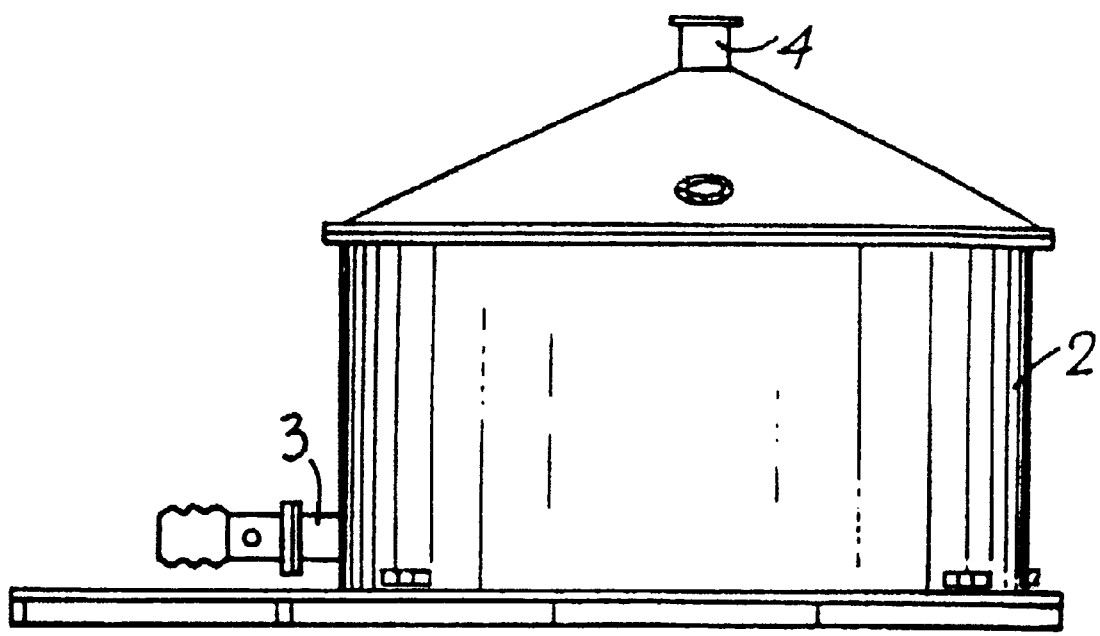
FIG. 14 is an elevational view of an alternative biofiltration apparatus according to the invention.
Figure 15:
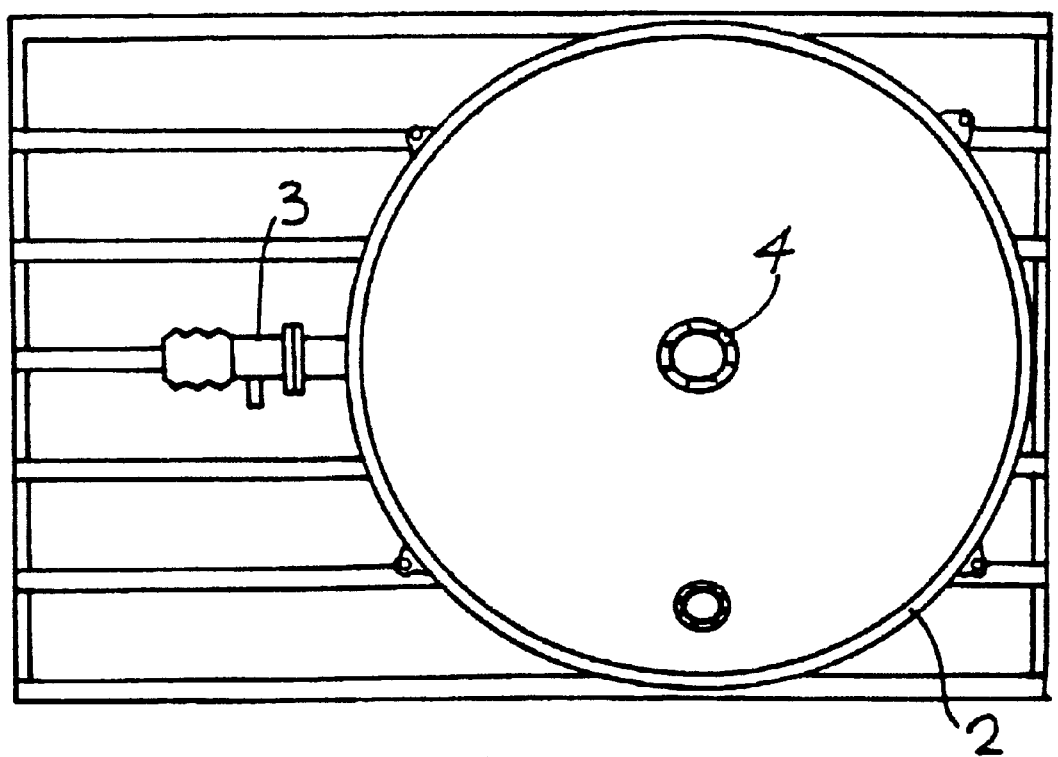
FIG. 15 is a plan view of the apparatus of FIG. 14.
Figure 16:
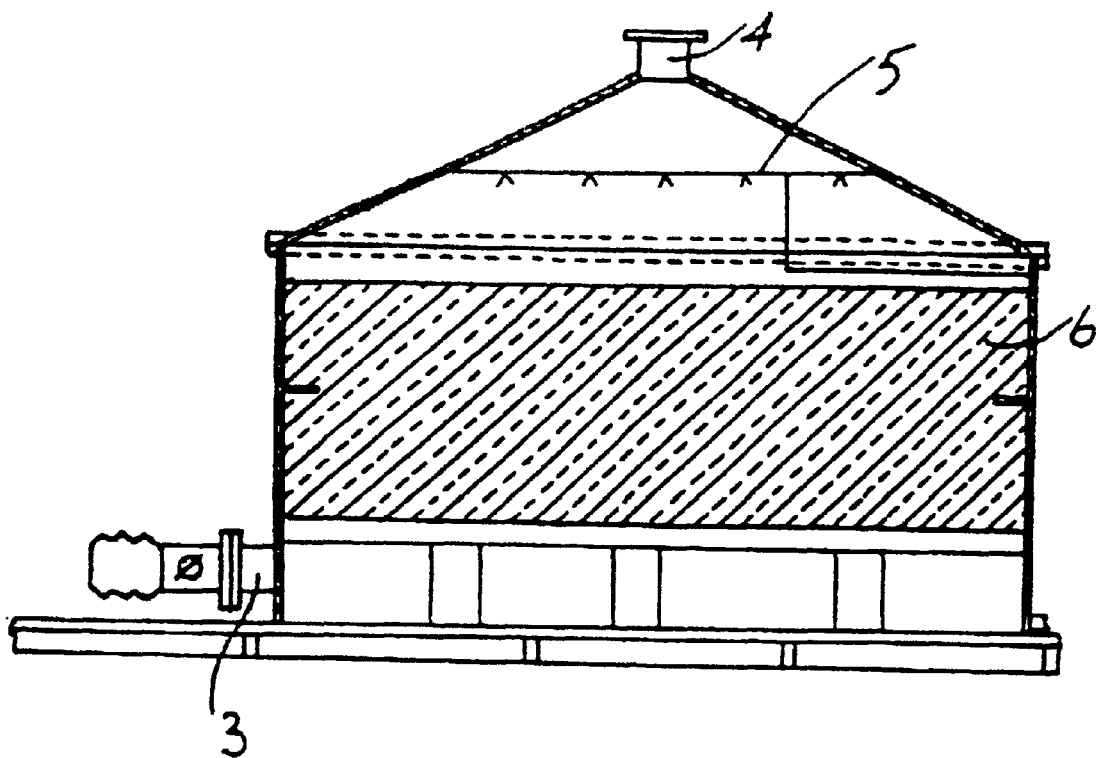
FIG. 16 is a cross-sectional view on the line A—A of FIG. 15.

FIGS. 10 to 12 illustrate a half mussel shell for use as a packing element and fragments of *Mytilus Edulis* which mussel shell was the preferred packing element for the packing 6 used in the examples illustrated in the present specification. These are identified by the reference numeral 24.

Figure 13:
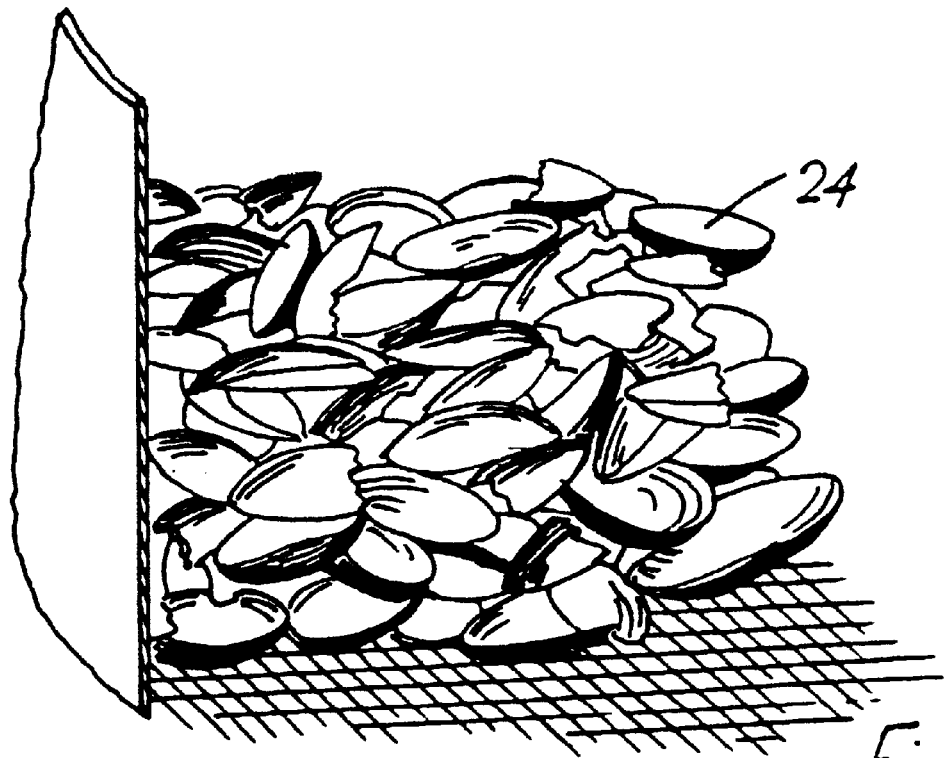
FIG. 13 illustrates portion of the filtration bed containing the mussel shells illustrated in FIGS. 11 to 13.

Referring now specifically to FIG. 13 there is illustrated portion of a packing of the mussel shells and shows the random nature of the arrangement.

Various tests were carried out on the plants of FIGS. 2 and 3 which were physically the same plant with different arrangements used. The following are the dimensions and other details.

Dimensions of Scrubber

Column Diameter: 0.21 m

Column Height: 1.4 m

The column is of CPV Propylene material.

Details of Packing

Mussel Shells (Density approximately 500 g/liter)

Volume of shells 36.3 liters

Height of shells in column 1.0 m

Shells were inoculated with *Thiosphaera pantotropha*

Wastewater from sewage plant was used as water source. This contains bacteria from the genic Thiobacillus, Nitrosomonas, and Nitrobacter.

It will be noted that some of the packing elements, for example, the mussel shells in FIG. 13 are oriented so that they will naturally contain liquid or water in that their mouth faces upwards, while others are so oriented that any liquid or material falling thereon will flow off. Thus, the packing 6 naturally forms a series of liquid and bacteria holding reservoirs and other surfaces which will be free of bacteria. When the packing was placed in position, the packing was sprayed with a solution of $CaCl_2$ and in turn when it was ready to activate the system the necessary biological material mixed with sodium alginate or any other suitable immobiliser was sprayed onto the packing. Obviously because of the shape of the packing, portions of the packing retain the biological material which reacts with the CaCl$_2$ forming a relatively solid gel which remains in position. It will be noted however that the whole of the packing material is not coated and the shape and orientation of the packing material assists this and the uncoated packing material will be attacked by H$_2$S which will react with the CaCO$_3$ and thus the necessary activity will start once gases are introduced into the plant.

The shape of the individual elements of calcarous material is all important for the correct inoculation of the packing with bacteria and for the maintenance of the bacteria during periods of little or no feed. If any attempt was made to inoculate a conventional packing or even one of ground calcarous material using CaCl$_2$ and sodium alginate or any other suitable immobiliser that would lead to the formation of a gel which would be useless in that a scum or impenetrable layer would be formed on the packing thus preventing useful operation of the biofiltration plant.

As will be illustrated below in respect of microorganism viability (see Table 18), the particular shape or shell-like arrangement is particularly advantageous in that there is generally speaking a deep gel within which the bacteria can survive for some considerable time. Also it is believed that a certain amount of food for the bacteria will naturally be stored within the packing. Thus the present construction of packing is particularly advantageous for the activation and maintenance of the bacteria.

In one test the total bacterial count carried out on a sample of shells and a sample of recirculating liquour.

cfu/g ranges from $1.3 \times 10^7$ to $6.8 \times 10^7$

It is important to appreciate that the apparatus according to the present invention can be used either as a bioscrubber or a biofilter. The main advantage obviously of working as a biofilter is that the requirement for water recirculation is removed.

The following tables show typical operating performance of the apparatus when used under various conditions. As the following Table 3 illustrates, the system is capable of treating high levels of H$_2$S even at high loading rates. Given this efficiency of treatment the footprint required for this technology is greatly reduced by comparison to a standard biofilter.

TABLE 3

H$_2$S removal as a Bioscrubber

| H$_2$S Inlet (ppm) | Air Flow Rate | H$_2$S Outlet | Removal Efficiency (%) |
|---|---|---|---|
| 20 | 200 | ND | 100 |
| 50 | 200 | ND | 100 |
| 100 | 200 | ND | 100 |
| 150 | 200 | 2.5 | >98 |
| 200 | 200 | 8.1 | >95 |
| 250 | 200 | 49 | >80 |

In addition, it will be seen that with quite substantial flow rates there was an inability to detect in the particular test any H$_2$S at the outlet even with concentrations as high as 100 ppm. However, the removal of other compounds is also necessary and the efficiency of the system can be shown from the following Table 4. As indeed does the following Table 5 illustrate its odour removing efficiencies.

TABLE 4

Removal of odorous compounds other than H$_2$S

| COMPOUND | CONCENTRATION | % REMOVAL |
|---|---|---|
| Mercaptan | 20 | 100 |
| Mercaptan | 70 | 97 |
| Ammonia | 30 | 100 |
| Ammonia | 45 | 100 |
| Ammonia | 100 | 100 |
| Triethyl Amine | 15 | 100 |
| Triethyl Amine | 35 | 96 |

TABLE 5

Efficiency of apparatus in a sewage treatment plant

| INLET OU/M$^3$ | % REMOVAL |
|---|---|
| 25,090 | >98 |
| 42,310 | >99 |

A pilot plant utilising the technology was installed at a meat rendering facility and it was very efficient in the removal of odour as is shown by the accompanying Table 6.

TABLE 6

| Inlet Odour ou/m$^3$ | % Removal |
|---|---|
| 78,200 | >95 |
| 58,492 | >96 |

As mentioned above it is possible for the apparatus to operate as a biofilter. This is shown by Table 7 being one example of tests carried out on the apparatus of FIG. 8 i.e. when operated as a biofilter in the removal of H$_2$S.

TABLE 7

Operation as a Biofilter

| Inlet Concentration | Air Flow Rate | Outlet Concentration | % Removal |
|---|---|---|---|
| 20 | 150 | ND | 100 |
| 50 | 150 | ND | 100 |
| 100 | 150 | ND | 100 |
| 150 | 150 | 2 | >98 |
| 200 | 150 | 50 | >75 |

Apparatus according to the present invention is an effective odour abatement system in combination with other technologies. It can thus be used as a pre-filter in combination with a more conventional biofilter such as a peat biofilter, manufactured by us. With this use, the peat is protected from peak loadings of H$_2$S, thereby removing any possibility of souring the system. This has been successfully employed by us in the treatment of sewage gases. One example of this is illustrated in Table 8 where foul air was first treated using the apparatus according to the present invention with the inlet gas first scrubbed in this apparatus and subsequently polished in a peat biofilter.

TABLE 8

Use as a Pre-filter in a
2-Stage Odour Abatement System

| COMPOUND | INLET CONCENTRATION | OUTLET CONCENTRATION | % REDUCTION |
|---|---|---|---|
| $H_2S$ | 152 | ND | 100 |

One of the major features of the present invention is ensuring of the optimum activity of the micro-organisms present in the system. The precise mix of bacteria and fungi will vary depending on the capacity of the inlet gases and the following Table 9 illustrates some typical examples of microorganisms used in the apparatus according to the invention.

TABLE 9

Examples of Microbial Cultures

| COMPOUND | CULTURE |
|---|---|
| Ammonia | Nirosomonas, Nitrobacter |
| Sulphur containing Compounds | Thiobacillus, Thiosphera |
| VOC's | Pseudomonas, Rhodococcus, Fungi |
| PAH | Streptomyces, Pseudomonas, Fungi |

It has long been known that in seeding a biological system with bacteria, it is necessary to ensure the inoculum is not washed from the filter media before it becomes effectively established. The use of the shell-like structure of media according to the present invention achieves this aim. In addition, it is also necessary to ensure that the culture survives during periods of starvation as inlet concentrations dip in concentration as well as peak. The liquid retention of the present media goes a long way to achieving this and by employing this method of inoculation, bacteria remain viable in the shells over considerable periods of starvation.

The following Tables 10 to 18 illustrate the apparatus according to the invention in operation under various conditions and with calcarous shells of marine animal origin. In the particular examples, the shells were bivalves of the phylum Mollusca and particularly *Mytilus Edulis*. Table 18 shows that in the absence of any inlet food by the system turned off, the microorganism remained viable in calcium alginate beds for up to three weeks. There was a 90% reduction in viable count during this period, however, sufficient activity remained for the system to restart.

TABLE 10

Bioscrubber

| | Air Flow Rate $m^3/hr/m^3$ media | | | | | |
|---|---|---|---|---|---|---|
| $H_2S$ Inlet (ppm) | 50 | 100 | 150 | 200 | 250 | 300 |
| 20 | 100 | 100 | 100 | 100 | >95% | >95% |
| 50 | 100 | 100 | 100 | 100 | >90 | >75 |
| 100 | 100 | 100 | 100 | 100 | >90 | >70 |
| 150 | 100 | 100 | 100 | >98 | >85 | >60 |
| 200 | 100 | 100 | >97 | >95 | >75 | >50 |
| 250 | >98 | >90 | >85 | >80 | — | — |

TABLE 11

Biofilter

| | Air Flow Rate $m^3/hr/m^3$ media | | | | | |
|---|---|---|---|---|---|---|
| $H_2S$ Inlet (ppm) | 50 | 100 | 150 | 200 | 250 | 300 |
| 20 | 100 | 100 | 100 | 100 | >80 | >60 |
| 50 | 100 | 100 | 100 | >92 | >75 | >50 |
| 100 | 100 | 100 | 100 | >90 | >60 | — |
| 150 | 100 | 100 | >98 | >75 | — | — |
| 200 | >95 | >85 | >70 | — | — | — |
| 250 | >90 | >50 | — | — | — | — |

Sprinkling rate—8 $l/m^3$ of material/hr—500 $l/m^3$ material/hr.

Referring to the following Table 12 there is shown the number of days required to achieve the optimum removal of effluent gases in the plants operating either as a bioscrubber or as a biofilter. It shows the various methods of inoculating the plant. If, simply, a liquid culture is added to the shells as shown under item no. 1, it takes 10 days for the bioscrubber to reach optimum performance and 21 days when operating as a biofilter. When in the shape of impregnated beads a different performance rate is achieved. To so inoculate sodium alginate powder is heated which then liquifies and is poured in droplets mixed with bacteria into a solution of calcium chloride where it is effectively formed into small beads. The advantage of using calcium alginate beads is that they can be supplied and stored for some considerable time and then simply scattered onto the shells when it is required to start the plant. There is then given the results from coating the shells as described above which is a very efficient way of inoculating the plant. Finally the figures are given for when no inoculation is carried out, but the plant is merely allowed to operate until it develops sufficient microorganisms. One of the primary advantages therefore of the method according to the present invention is the speed of inoculation.

TABLE 12

Inoculation - @ 100 ppm $H_2S$ @ flow rate of 100 $m^3/hr$

| | Days to achieve optimum removal | |
|---|---|---|
| | Bioscrubber | Biofilter |
| 1. Liquid culture addition to shells | 10 | 21 |
| 2. Ca Alginate beads | 14 | 15 |
| 3. Ca Alginate coating on shells | 10 | 14 |
| 4. No inoculum | 30–35 | 35–40 |

TABLE 13

100 ppm @ flow rate of 100 $m^3/hr/m^3$ material
Air temperatures @ 15° C.

| Temp (° C.) $H_2O$ | % Removal |
|---|---|
| 4 | 100 |
| 10 | 100 |
| 15 | 100 |
| 22 | 100 |
| 30 | 100 |
| 35 | 100 |
| 40 | 100 |

TABLE 14

Odour Removal - as scrubber

| Inlet ou/m³ | % Removal |
|---|---|
| 75,680 | >95 |
| 25,040 | >98 |
| 42,310 | >98 |

TABLE 15

Mercaptan - System operated as scrubber
(re-circulation rate 500 l/hr)

| Inlet (ppm) | Outlet (ppm) | % Removal |
|---|---|---|
| 5 | <0.1 | 100 |
| 20 | <0.1 | 100 |
| 70 | 2 | 97 |

TABLE 16

$NH_3$ - System operates as a scrubber
(recirculation rate 500 l/hr)

| Inlet (ppm) | Outlet (ppm) | % Removal |
|---|---|---|
| 10 | <0.1 | 100 |
| 30 | <0.1 | 100 |
| 45 | <0.1 | 100 |
| 100 | <0.1 | 100 |

TABLE 17

Triethyl Amine

| Inlet (ppm) | Outlet (ppm) |
|---|---|
| 5 | <0.1 |
| 15 | <0.1 |
| 35 | 1.5 |

TABLE 18

Microorganism Viability

| Time | Storage @ 22° C. | Storage @ 4° C. |
|---|---|---|
| Day 1 | $1.34 \times 10^9$ | $1.13 \times 10^9$ |
| Day 4 | $8.37 \times 10^8$ | $1.1 \times 10^9$ |
| Day 7 | $4.54 \times 10^8$ | $3.8 \times 10^8$ |
| Day 10 | $3.65 \times 10^8$ | $4.32 \times 10^8$ |
| Day 14 | $1.01 \times 10^8$ | $1.3 \times 10^8$ |
| Day 21 | $8.9 \times 10^7$ | $9.25 \times 10^7$ |

It was noted during the tests that the power consumption had been relatively low and accordingly further tests were carried out to ascertain the back pressure in beds of various heights. The results are given in Table 19 where it will be seen that the particular arrangement according to the invention allows relatively high beds to be used without appreciable power requirements.

TABLE 19

| Bed Height (m) | Back Pressures (mbar) Dates | | | | | | |
|---|---|---|---|---|---|---|---|
| TEST DATES | 10/6 | 11/7 | 10/8 | 11/9 | 12/10 | 11/11 | 11/12 |
| 1.0 | 0.01 | 0.02 | 0.01 | 0.01 | 0.02 | 0.01 | 0.01 |
| 2.0 | 0.01 | 0.01 | 0.02 | 0.01 | 0.01 | 0.01 | 0.02 |
| 3.0 | 0.02 | 0.02 | 0.02 | 0.02 | 0.02 | 0.02 | 0.02 |

Another biofiltration apparatus according to the invention is illustrated in FIGS. 10 to 13. The arrangement is similar to that described with reference to FIG. 1 and like parts are assigned the same reference numerals. The packing is as described in Example 1 with the exception of the following dimensions:

| | |
|---|---|
| Height of Bed: | 0.8 m |
| Diameter of Bed: | 2.7 m |
| Volume of Bed: | 5.3 m³ approximately |

The apparatus was operated in a countercurrent flow with foul air entering at the base of the apparatus. Recirculation water was contained in a 1 m³ sump and make-up water was supplied via a ballcock system. The irrigation sprays delivered water at approximately 60 l/min. Gas loading was at a rate of 100 m³/hr/m³ of bed material. The level of $H_2S$ at the inlet was 60 ppm. In continuous operation over 7 weeks, no $H_2S$ was detected at the outlet. Mercaptans were measured at 10–15 ppm in the inlet gas, no mercaptans were detected at the gas outlet.

The system may be operated in either countercurrent or concurrent flow. A particular advantage of operating the system according to the present invention in concurrent flow with water which is obviously fed by gravity onto the packing is that the major reaction between the calcarous material and the $H_2S$ will occur at the top of the bed, thus further improving the structural rigidity of the packing.

It will be appreciated that while the examples have concentrated largely on the removal of odours caused by $H_2S$, the method and apparatus of the invention may also be used to remove other malodorous gases such as organosulphur compounds, organonitrogen compounds or other V.O.C's.

IN-SITU TESTS

Various tests have been carried out on apparatus according to the present invention operating in various plants and the following given details of the tests and operations which are given by way of a series of examples.

EXAMPLE 1

Sewage Treatment Works Site A

This plant operated in a manner similar to the test rig of FIG. 2.

Problem

Sludge holding tanks which also received sludges from outlying small works some of which had saline infiltration. The resulting off gases showed high levels of $H_2S$ Design

| | | |
|---|---|---|
| Air Flow | 500 m³/hr | |
| H₂S Concentration | 40–150 ppm | |
| Mercaptan Concentration | 5–70 ppm | |
| Odour Concentration | 25,000 ou/m³ | |

Abatement System

The apparatus according to the present invention was operated as a bioscrubber and achieved the following results:

Performance

| Compound | Inlet Concentration | Outlet Concentration | % Removal |
|---|---|---|---|
| H₂S | 40–150 ppm | ND | 100 |
| Mercaptan | 20 ppm | <0.1 ppm | 100 |
| Mercaptan | 70 | 2 ppm | 97% |
| Odour | 75,000 | 2,800 | >95 |

EXAMPLE 2

Sewage Treatment Works Site B

This operated as the plant of FIG. 3.

Problem

The problem in this case was the off gases from sludge holding tanks.

DESIGN

| | | |
|---|---|---|
| Air Flow | 1,600 m³/hr | |
| H₂S Concentration | 1–250 | |
| Mercaptan Concentration | 0–5 ppm | |

Abatement System

The apparatus according to the present invention was operated as a pre-filter feeding a standard peat filter acting as a polishing system and the following was achieved:

Performance

| Compound | Inlet Concentration | Outlet Concentration | % Reduction |
|---|---|---|---|
| H₂S | 75 ppm | ND | 100 |
| Mercaptan | 5 | ND | 100 |

EXAMPLE 3

Sewage Treatment Works Site C

This also operated in the same manner as the plant of FIG. 3 in a two stage process.

Problem

The problem in this case was the off gases from the sludge de-watering facility were causing a major problem.

Design

Air Flow—500 m³/hr

H₂S Concentration—7–80

Abatement System

The apparatus according to the present invention was used as a pre-filter feeding a conventional peat loaded filtration plant acting as a polishing filter and the following results were achieved:

| Compound | Inlet Concentration | Outlet Concentration | % Reduction |
|---|---|---|---|
| H₂S | 7–60 ppm | ND | 100 |

EXAMPLE 4

Pumping Station Sewage Plant Site D

Operation in the same manner as the plant of FIG. 3.

PROBLEM

In this case there were peaks of H₂S gas from a sewage pumping station.

Design

Air Flow—750 m³/hr

H₂S Concentration—200 ppm

Abatement Technology

The apparatus according to the present invention was operated as a biofilter. The following results were achieved:

Performance

| Compound | Inlet Concentration | Outlet Concentration | % Reduction |
|---|---|---|---|
| H₂S | 0–25 ppm | ND | 100 |

It will be appreciated that the shell-like shape ensures that liquids are held efficiently and that this will increase the life expectancy of the inoculant. It will also be appreciated that because of the fact that the present system is a biological system, it offers all the benefits of heretofore known biologically based filters with a number of important additional advantages.

Firstly it is a high performance filter once designed and installed odour and H₂S associated problems are easily managed and controlled.

It has the great advantage of all biological systems in that there is an absence of secondary waste. Additionally there are no health risks associated with the apparatus as no harmful chemicals, etc. are required: the method of filtration according to the present invention is relatively economical in that the running costs are relatively low and the bed needs to be replaced at intervals greater than two years. Further the shells are relatively easily disposed of.

Finally, due to the increased through-put through the bed, there is reduced retention time in the bed which leads to a reduction in footprint. One of the great advantages of the use of the beds is it provides a self-supporting media which allows the installation of beds up to three meters high without internal supports. It is envisaged that with a suitable choice of elements of calcarous material that greater heights may be achieved.

While the plant has been described above as acting both as a biofiltration plant and a scrubber it should be appreciated that the reason why the plant can act in this way is because of the greater flexibility allowed by the construction of the packing which has a generally open work construction and thus allows a significant amount of water to be put through it. This would not be the case for example with other forms of packing. A further advantage is that it operates as a bioscrubber better than, for example, with a plastics material as the filtration medium in the packing because calcarous material has a higher pH value and therefore can run better with higher concentrations of H₂S.

Another particular advantage of an effluent treatment system according to the present invention is that where it is desired to have maximum odour removal, the system can be used as the first stage of a two stage process, where the second stage can contain different packing materials to ensure even higher levels of odour removal. The advantage of an effluent treatment system according to the present invention is that the second stage of such a treatment system can be smaller than would necessarily be the case with known equipment.

Indeed, it is envisaged that if a particular biofiltration or scrubbing system is not working to its optimum that a certain amount of the packing material contained therein may be replaced with packing material according to the present invention. Ideally, one would place this packing of randomly arranged elements of calcarous material on top of the existing bed and lead the gas through the bed from above it in concurrent flow with water.

Apparatus according to the present invention is versatile in use in that a wide range of compounds can be removed which enables the apparatus to be employed as a complete odour treatment system without the necessity for additional equipment. The apparatus according to the invention can treat very high peak inlet concentrations of $H_2S$ of up to 250 ppm and can be combined with polishing technologies such as peat biofilters or dry media. It will also be appreciated that the unique method of coating the shells with the microbial inoculum ensures the required bacteria will be retained within the treatment system and performance difficulties which can be associated with low pH are controlled by the filter media.

While a considerable amount of the discussion above has emphasised the removal of $H_2S$, it is important to appreciate that the packing according to the present invention is particularly useful in the removal of other effluent gases such as ammonia. In this case a nitrifying organism is used.

The invention is not limited to the apparatus materials and methods described above which may be varied in detail.

We claim:

1. An effluent treatment system for removing effluent gases from a gas stream comprising:
    a housing having spaced apart gas inlet and outlet; and
    a packing between inlet and outlet, the packing comprising:
        a plurality of separate elements of calcarous material each having a liquid retaining reservoir; and the elements being so arranged that some of the elements form individual bacteria and packing moisture retaining elements and others are oriented to form voids for the passage of gas and calcarous surfaces for reaction with a gas stream passing between gas inlet and outlet; and in which the packing contains bacteria.

2. An effluent treatment system as claimed in claim 1 wherein the packing has a bulk density of less than 900 g/liter.

3. An effluent treatment system as claimed in claim 1 wherein the packing has a bulk density of less than 600 g/liter.

4. An effluent treatment system as claimed in claim 1 wherein the packing has a bulk density of approximately 500 g/liter.

5. An effluent treatment system as claimed in claim 1 wherein the packing is spent shell of shell fish.

6. An effluent treatment system as claimed in claim 5 wherein the shell material is a half mussel shell.

7. An effluent treatment system as claimed in claim 6 wherein the mussel shell is a bivalve of the phylum mollusca.

8. An effluent treatment system as claimed in claim 1 wherein the bacteria are selected from one or more of: *thiosphaera pantotropha, thiobacillus thioparus, thiobacillus thiooxidans, thiobacillus ferroxidans,* nirosomonas, nitrobacter, pseudomonas, rhodococcus, fungi, and streptomyces.

9. An effluent treatment system as claimed in claim 7 wherein the mussel shell is a bivalve of the species *Mytilus Edulis*.

10. An effluent treatment system for removing effluent gases from a gas stream comprising:
    a housing having spaced apart gas inlet and outlet; and
    a packing between inlet and outlet, the packing comprising:
        a plurality of separate elements formed from ground calcarous material mixed with a binding agent each having a liquid retaining reservoir; and the elements being so arranged that some of the elements form individual bacteria and packing moisture retaining elements and others are oriented to form voids for the passage of gas and calcarous surfaces for reaction with a gas stream passing between gas inlet and outlet; and in which the packing contains bacteria.

11. An effluent treatment system as claimed in claim 10 wherein the binding agent is acid resistant.

12. An effluent treatment system as claimed in claim 10 wherein the binding agent is Keratin.

13. An effluent treatment system for removing effluent gases from a gas stream comprising:
    a housing having spaced apart gas inlet and outlet; and
    a packing between inlet and outlet, the packing comprising:
        a plurality of separate elements of calcarous material each having a liquid retaining reservoir; the elements being so arranged that some of the elements form individual bacteria and packing moisture retaining elements and others are oriented to form voids for the passage of gas and calcarous surfaces for reaction with a gas stream passing between gas inlet and outlet; and in which the packing contains bacteria which are selected to assist the break-down of sulphur and sulphur analogues.

14. An effluent treatment system as claimed in claim 13 wherein the packing has a bulk density of less than 900 g/liter.

15. An effluent treatment system as claimed in claim 13 wherein the packing has a bulk density of less than 600 g/liter.

16. An effluent treatment system as claimed in claim 13 wherein the packing has a bulk density of approximately 500 g/liter.

17. An effluent treatment system as claimed in claim 13 wherein the packing is spent shell of shell fish.

18. An effluent treatment system as claimed in claim 17 wherein the shell material is a half mussel shell.

19. An effluent treatment system as claimed in claim 18 wherein the mussel shell is of the species *Mytilus Edulis*.

20. An effluent treatment system as claimed in claim 13 wherein the bacteria are of the Thiobacillus and/or Thiosphaera species.

21. An effluent treatment system as claimed in claim 13 wherein nutrients and/or trace elements are added to maintain an active biomass.

22. An effluent treatment system as claimed in claim 13 wherein inoculation means are provided comprising:
    spray means for spraying the calcarous packing with a calcium solution, and for inoculating the packing with bacteria.

23. An effluent treatment system as claimed in claim 13 wherein the bacteria are mixed with sodium alginate.

24. An effluent treatment system as claimed in claim 22 wherein the calcium solution is a solution of calcium chloride.

25. An effluent treatment system for removing effluent gases from a gas stream comprising:

a housing having spaced apart gas inlet and outlet; and a packing between inlet and outlet, the packing comprising:

a plurality of separate elements formed from ground calcarous material mixed with a binding agent each having a liquid retaining reservoir; the elements being so arranged that some of the elements form individual bacteria and packing moisture retaining elements and others are oriented to form voids for the passage of gas and calcarous surfaces for reaction with a gas stream passing between gas inlet and outlet; and in which the packing contains bacteria which are selected to assist the break-down of sulphur and sulphur analogues.

26. An effluent treatment system as claimed in claim 25 wherein the binding agent is acid resistant.

27. An effluent treatment system as claimed in claim 25 wherein the binding agent is Keratin.

28. An effluent treatment system as claimed in claim 25 wherein inoculation means are provided comprising:

spray means for spraying the calcarous packing with a calcium solution, and for inoculating the packing with bacteria.

29. An effluent treatment system for removing effluent gases from a gas stream comprising;

a housing having spaced apart gas inlet and outlet; and a packing between inlet and outlet, the packing comprising:

a plurality of separate elements formed from ground calcarous material mixed with a binding agent each having a liquid retaining reservoir; the elements being so arranged that some of the elements form individual bacteria and packing moisture retaining elements and others are oriented to form voids for the passage of gas and calcarous surfaces for reaction with a gas stream passing between gas inlet and outlet; and inoculation means are provided comprising spray means for spraying the calcarous packing with a calcium solution and for inoculating the packing with bacteria.

30. An effluent treatment system as claimed in claim 29 wherein the binding agent is acid resistant.

31. An effluent treatment system as claimed in claim 29 wherein the bacteria are selected to assist the breakdown of sulphur and sulphur analogues.

32. An effluent treatment system as claimed in claim 29 wherein nutrients and/or trace elements are added to maintain an active biomass.

33. An effluent treatment system as claimed in claim 29 wherein the bacteria are mixed with sodium alginate.

34. An effluent treatment system as claimed in claim 29 wherein the calcium solution is a solution of calcium chloride.

35. An effluent treatment system for removing effluent gases from a gas stream comprising:

a housing having spaced apart gas inlet and outlet; and a packing between inlet and outlet, the packing comprising:

a plurality of separate elements of calcareous material each having a liquid retaining reservoir; the elements being so arranged that some of the elements form individual bacteria and packing moisture retaining elements and others are oriented to form voids for the passage of gas and calcareous surfaces for reaction with a gas stream passing between gas inlet and outlet; and in which the packing contains bacteria which are selected to assist the break-down of ammonia and ammonia analogues.

36. An effluent treatment system as claimed in claim 35 wherein the bacteria comprises any one of or a combination of nitrosomonas and nitrobactor to remove ammonia.

37. An effluent treatment system for removing effluent gases from a gas stream comprising:

a housing having spaced apart gas inlet and outlet; and a packing between inlet and outlet, the packing comprising:

a plurality of separate elements of calcareous material each having a liquid retaining reservoir; the elements being so arranged that some of the elements form individual bacteria and packing moisture retaining elements and others are oriented to form voids for the passage of gas and calcareous surfaces for reaction with a gas stream passing between gas inlet and outlet; and in which the packing contains bacteria which are selected to assist the break-down of V.O.C.'s.

38. An effluent treatment system as claimed in claim 37 wherein the bacteria comprises any one of or a combination of pseudomonas, rhodococcus, and fungi to remove V.O.C.'s.

39. An effluent treatment system for removing effluent gases from a gas stream comprising:

a housing having spaced apart gas inlet and outlet; and a packing between inlet and outlet, the packing comprising:

a plurality of separate elements of calcareous material each having a liquid retaining reservoir; the elements being so arranged that some of the elements form individual bacteria and packing moisture retaining elements and others are oriented to form voids for the passage of gas and calcareous surfaces for reaction with a gas steam passing between gas inlet and outlet; and in which the packing contains bacteria which are selected to assist the break-down of P.A.H.'s.

40. An effluent treatment system as claimed in claim 39 wherein the bacteria comprises any one of or a combination of streptomyces, pseudomonas, and fungi to remove P.A.H.'s.

* * * * *